US008170640B2

(12) United States Patent
Kiraly et al.

(10) Patent No.: US 8,170,640 B2
(45) Date of Patent: May 1, 2012

(54) SYSTEM AND METHOD FOR TREE PROJECTION FOR DETECTION OF PULMONARY EMBOLISM

(75) Inventors: Atilla Peter Kiraly, Plainsboro, NJ (US); Carol L. Novak, Newton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1066 days.

(21) Appl. No.: 11/192,719

(22) Filed: Jul. 29, 2005

(65) Prior Publication Data
US 2006/0025674 A1 Feb. 2, 2006

Related U.S. Application Data

(60) Provisional application No. 60/598,097, filed on Aug. 2, 2004.

(51) Int. Cl.
*A61B 5/05* (2006.01)
(52) U.S. Cl. ........ 600/407; 600/425; 600/436; 382/128; 382/164; 382/173
(58) Field of Classification Search .................. 600/425, 600/407, 436, 437; 382/128, 131, 164, 173–180
See application file for complete search history.

(56) References Cited

U.S. PATENT DOCUMENTS

| 6,334,847 | B1 * | 1/2002 | Fenster et al. ................. 600/443 |
| 7,717,849 | B2 * | 5/2010 | Mathew et al. ................ 600/437 |
| 7,747,055 | B1 * | 6/2010 | Vining et al. .................. 382/131 |
| 2002/0009215 | A1 * | 1/2002 | Armato, III et al. .......... 382/131 |
| 2002/0028006 | A1 * | 3/2002 | Novak et al. ................... 382/128 |
| 2002/0028008 | A1 * | 3/2002 | Fan et al. ....................... 382/131 |
| 2003/0197704 | A1 | 10/2003 | Tek et al. |
| 2004/0015070 | A1 * | 1/2004 | Liang et al. ................... 600/407 |
| 2004/0101183 | A1 | 5/2004 | Mullick et al. |
| 2005/0110791 | A1 * | 5/2005 | Krishnamoorthy et al. .. 345/419 |
| 2006/0034511 | A1 * | 2/2006 | Verstraelen et al. ........... 382/173 |

FOREIGN PATENT DOCUMENTS

| WO | WO 01/37219 A | 5/2001 |
| WO | WO 01/37219 A1 * | 5/2001 |

OTHER PUBLICATIONS

Simon et al., "Paddle-Wheel CT Display of Pulmonary Arteries and Other Lung Structures: A New Imaging Approach," American Journal of Roentgenology, vol. 177:Jul. 1, 2001, pp. 195-198.*
Remy-Jardin et al., "Diagnosis of Central Pulmonary Embolism With Helical CT: Rove of Two-Dimensional Multiplanar Reformations," American Journal of Roentgenology, vol. 165:Nov. 5, 1995 pp. 1131-1138.*
Pichon et al., "A novel method for pulmonary emboli visualization from high-resolution CT images, Proceedings of the SPIE," vol. 5367, May 2004, pp. 161-170.*

(Continued)

*Primary Examiner* — Brian Casler
*Assistant Examiner* — Daniel Huntley

(57) ABSTRACT

A system and method for detecting an area of interest such as a pulmonary embolism in a structure of interest such as a vessel tree or airway tree are provided. The method comprises: segmenting image data of the structure of interest; and rendering two-dimensional images based on a function of the image data and the segmented image data within slabs defined by the segmented image data.

25 Claims, 10 Drawing Sheets

OTHER PUBLICATIONS

Kiraly Atilla P. et al., "Cartwheel Projections of Segmented Pulmonary Vasculature for the Detection of Pulmonary Embolism," *Proceedings of the SPIE*, vol. 5744, Apr. 2005 pp. 69-78 XP002356356.

Simon M. Boiselle et al., "Paddle-wheel CT display of pulmonary arteries and other lung structures: a new imaging approach," *American Journal of Roentgenology*, vol. 177:Jul. 1, 2001, pp. 195-198, XP009057509.

Remy-Jardin M. et al. "Diagnosis of central pulmonary embolism with helical CT: role of two-dimensional multiplanar reformations," *American Journal of Roentgenology*, vol. 165:Nov. 5, 1995 pp. 1131-1138 XP002356357.

Pichon E. et al., "A novel method for pulmonary emboli visualization from high-resolution CT images," *Proceedings of the SPIE*, vol. 5367, May 2004, pp. 161-170, XP002355834.

International Search Report.

Gonzalez et al., "Digital Image Processing", Second Edition, Prentice-Hall, 2002, pp. 86-87, 536-539 and 567-576.

\* cited by examiner

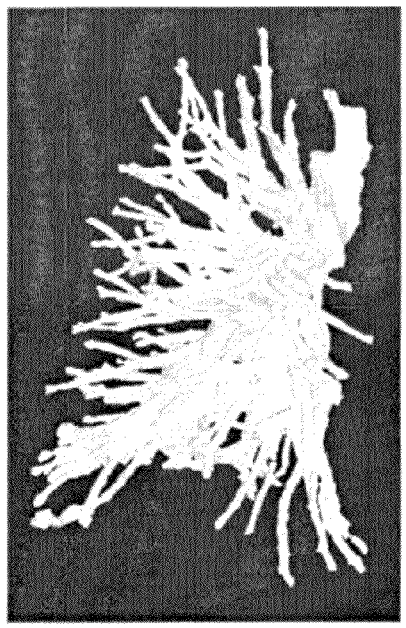 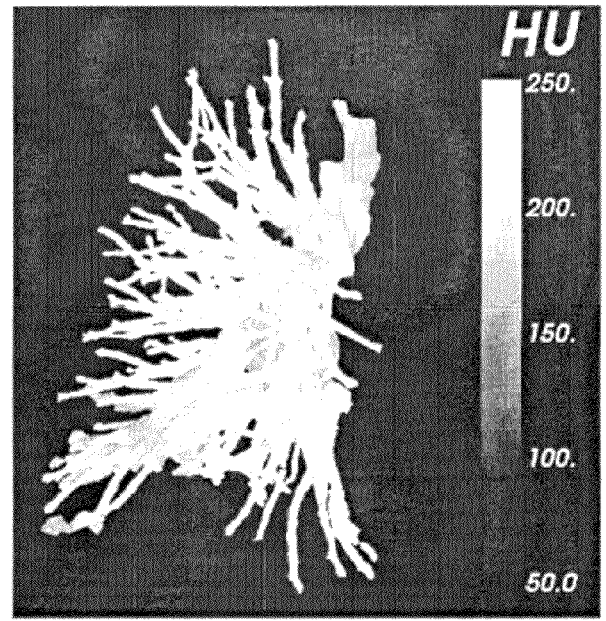
FIG. 1(a)  FIG. 1(b)

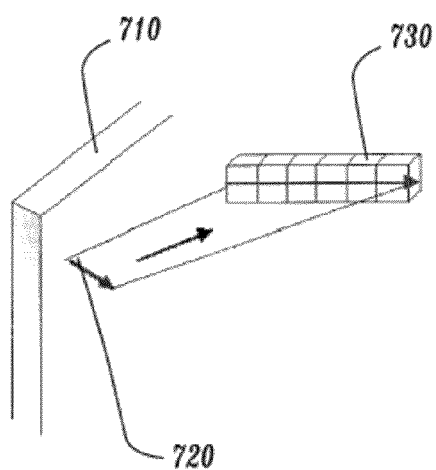 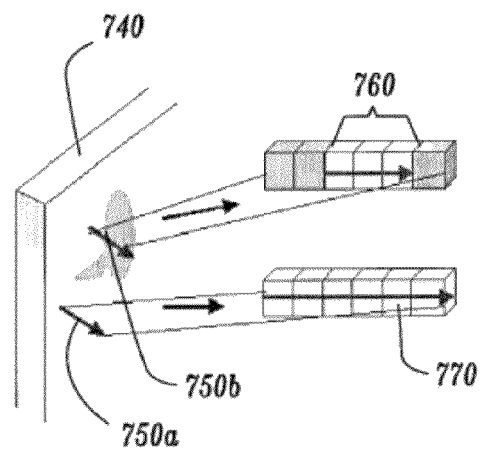
FIG. 7(a)  FIG. 7(b)

 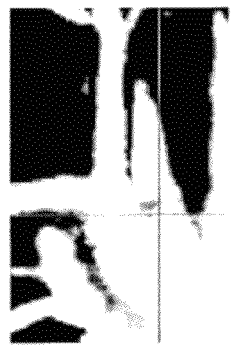  
FIG. 9(a)  FIG. 9(b)  FIG. 9(c)  FIG. 9(d)
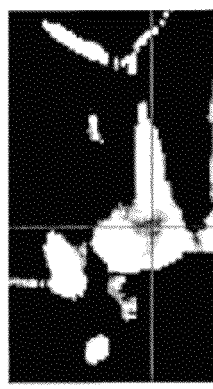  
FIG. 9(e)  FIG. 9(f)  FIG. 9(g)
 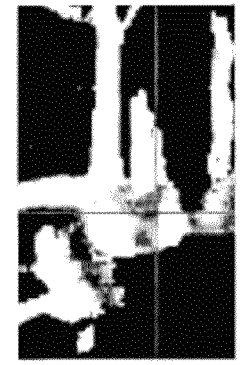  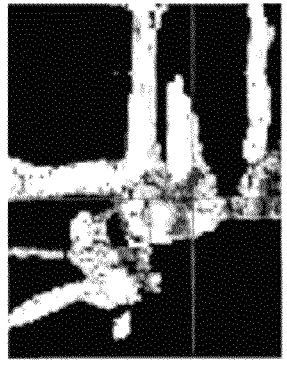
FIG. 9(h)  FIG. 9(i)  FIG. 9(j)  FIG. 9(k)

SYSTEM AND METHOD FOR TREE PROJECTION FOR DETECTION OF PULMONARY EMBOLISM

CROSS-REFERENCE TO RELATED APPLICATION

This application claims the benefit of U.S. Provisional Application No. 60/598,097, filed Aug. 2, 2004, a copy of which is herein incorporated by reference.

BACKGROUND OF THE INVENTION

1. Technical Field

The present invention relates to visualization and computer aided diagnosis and detection of pulmonary embolism, and more particularly, to a system and method for tree projection for detection of pulmonary embolism.

2. Discussion of the Related Art

A pulmonary embolism (PE) occurs when a piece of a blood clot from a deep vein thrombosis (DVT) breaks off and travels to an artery in a lung where it blocks the artery, damages the lung and puts a strain on the heart. This short-term complication is potentially life threatening and occurs in about ten percent of patients with acute DVT events. It may be even more common than generally realized because the majority of embolisms occur without symptoms.

Although PE is one of the most common causes of unexpected death in the United States, it may also be one of the most preventable. Prompt treatment with anticoagulants is essential to prevent loss of life. However, such treatment carries risks, making correct diagnosis critical. As a result, computed tomography angiography (CTA) is gaining increasing acceptance as a method of diagnosis by offering sensitivity and specificity comparable or superior to alternative methods such as pulmonary angiography and ventilation-perfusion scans.

Images acquired from 16-slice computed tomography (CT) scanners used during CTA provide very high-resolution data allowing for enhanced detection of emboli located in sub-segmental arteries. Analysis of the high-resolution data via two-dimensional (2D) slices involves tracking individual vessels and examining their contents. This analysis, however, can be time consuming, especially for peripheral arteries. For example, a radiologist must navigate through individual 2D slices while at the same time remembering the locations of the vessels being tracked. However, because the radiologist can only track a limited number of vessels at one time, the entire tracking process must be repeated.

Since intravenous contrast material does not penetrate into clots, radiologists identify pulmonary emboli on the 2D slices by looking within arteries for dark areas surrounded by bright contrast-filled blood. In a previous method for three-dimensional (3D) visualization of PE, a shaded surface display (SSD) of a pulmonary vessel tree is created and values inside the vessels are used to color their surface. The resulting visualization shows unblocked vessels as bright white areas and potential clots as dark spots. This 3D visualization method simplifies the search for peripheral PE because the entire vessel tree is shown at once and vessel tracking is not necessary.

The above-mentioned visualization also shows emboli in their anatomic context. However, the complete pulmonary vessel tree can be quite complex with numerous branching vessels. An exemplary vessel tree is shown in image (a) of FIG. 1 and an SSD for PE visualization is shown in image (b) of FIG. 1. As shown in FIG. 1, while the vessels on the front side of the trees may be readily inspected for suspicious dark areas, vessels on the far side of the trees are obscured by nearer vessels. Thus, in order to check for PE throughout a vessel tree, the user must navigate around the vessel tree taking care to inspect all sides.

In another method for PE detection, a paddlewheel of maximum intensity projections (MIPs) is rendered about the heart. This method does not require a radiologist to repetitively inspect the vessel tree when examining different regions. However, the vessels must be tracked and the entire dataset rendered without regard to content. Thus, regions of the parenchyma, airways and other extraneous structures influence the renderings. As a result, this prevents the use of an average intensity projection or other types of projection methods because the extraneous structures interfere with the visualization of the periphery arteries.

The paddlewheel method further requires thin slabs to achieve effective sensitivity because the MIPs may obscure PE regions if there is a partial blockage or a bright region in an area. This results in a significant number of images that must be analyzed to achieve an acceptable sensitivity. Accordingly, there is a need for an effective PE detection technique that allows for the examination of 2D images without requiring numerous thin MIP slabs.

SUMMARY OF THE INVENTION

The present invention overcomes the foregoing and other problems encountered in the known teachings by providing a system and method for tree projection for detection of PE.

In one embodiment of the present invention, a method for detecting an area of interest in a structure of interest, comprises: segmenting image data of the structure of interest; and rendering two-dimensional images based on a function of the image data and the segmented image data within slabs defined by the segmented image data. The structure of interest is segmented using one of a thresholding and size-based labeling, line-filter based or structure tensor-based segmentation technique.

When the structure of interest is a pulmonary vessel tree, the step of rendering comprises: initially orienting the slabs along an axis of the pulmonary vessel tree; sizing the slabs to cover one of left and right lungs or one of the left or right lungs of the pulmonary vessel tree; computing projections of the slabs rotated about the pulmonary vessel tree; and slicing the pulmonary vessel tree.

The slabs are initially oriented along one of the x, y or z axis. The slabs are initially oriented along one of an axis defined by a patient's anatomy or a central axis of the pulmonary vessel tree.

The number of two-dimensional images is defined by:

$$N = \frac{\pi}{2 \times \tan^{-1}(t/(2 \times r))},$$

where N is the number of two-dimensional images taken as a ceiling value of the fraction, t is a thickness of the slabs and r is a radius of influence.

The number of two-dimensional images is also defined by:

$$N = \frac{\pi \times r}{t},$$

where N is the number of two-dimensional images taken as a ceiling value of the fraction, t is a thickness of the slabs and r is a radius of influence.

The number of slabs is defined by one of a function of the slab thickness, slab overlap or radius of the structure of interest. The slabs are rendered using one of a maximum intensity projection, average intensity projection, minimum intensity projection or $1^{st}$ quartile rendering technique.

The method further comprises: presenting the slabs as a cine loop; and adjusting the cine loop. The adjustment is one of speed, slab thickness, rotation axis or rendering method. The area of interest is one of a pulmonary embolism, airway stenosis or brain aneurysm and the structure of interest is one of a vessel tree or airway tree.

In another embodiment of the present invention, a method for detecting abnormalities in a pulmonary vessel tree, comprises: segmenting image data of the pulmonary vessel tree; and rendering two-dimensional images based on a function of the image data and the segmented image data within slabs defined by the segmented image data. The pulmonary vessel tree is segmented using one of a thresholding and size-based labeling, line-filter based or structure tensor-based segmentation technique.

The step of rendering comprises: initially orienting the slabs along an axis of the pulmonary vessel tree; sizing the slabs to cover one of left and right lungs or one of the left or right lungs of the pulmonary vessel tree; computing projections of the slabs rotated about the pulmonary vessel tree at increasing angles; and slicing the pulmonary vessel tree by sweeping through a complete circle.

The slabs are initially oriented along one of the x, y or z axis, an axis defined by a patient's anatomy or a central axis of the pulmonary vessel tree. The number of two-dimensional images is defined by:

$$N = \frac{\pi}{2 \times \tan^{-1}(t/(2 \times r))},$$

where N is the number of two-dimensional images taken as a ceiling value of the fraction, t is a thickness of the slabs and r is a radius of influence.

The number two-dimensional images is also defined by:

$$N = \frac{\pi \times r}{t},$$

where N is the number of two-dimensional images taken as a ceiling value of the fraction, t is a thickness of the slabs and r is a radius of influence.

The number of slabs is defined by one of a function of the slab thickness, slab overlap or radius of the structure of interest. The slabs are rendered using one of a maximum intensity projection, average intensity projection, minimum intensity projection or $1^{st}$ quartile rendering technique.

The method further comprises: presenting the slabs as a cine loop; and adjusting the cine loop, wherein the adjustment is one of speed, slab thickness, rotation axis or rendering method. The abnormality is a pulmonary embolism.

In yet another embodiment of the present invention, a system for detecting an area of interest in a structure of interest, comprises: a memory device for storing a program; a processor in communication with the memory device, the processor operative with the program to: segment image data of the structure of interest; and render two-dimensional images based on a function of the image data and the segmented image data within slabs defined by the segmented image data.

The structure of interest is one of a vessel tree or airway tree. The area of interest is one of a pulmonary embolism, airway stenosis or brain aneurysm. The image data is acquired using one of a computed tomography or magnetic resonance imaging device.

The processor is further operative with the program code, when rendering, to: initially orient the slabs along a central axis of the structure of interest; compute projections of the slabs rotated about the structure of interest at increasing angles; and slice the structure of interest. The processor is further operative with the program code to: present the slabs as a cine loop; and adjust the cine loop.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

BRIEF DESCRIPTION OF THE DRAWINGS

FIG. 1 is a pair of images illustrating the results of pulmonary vessel segmentation from a high-resolution CT image;

FIG. 7 is pair of diagrams illustrating projection methods used to compute a 2D image from a slab according to an exemplary embodiment of the present invention;

FIG. 9 is a series of images illustrating comparisons among different rendering parameters and slab thicknesses at the same region and axis of an image according to an exemplary embodiment of the present invention.

DETAILED DESCRIPTION OF EXEMPLARY EMBODIMENTS

Figure 2:
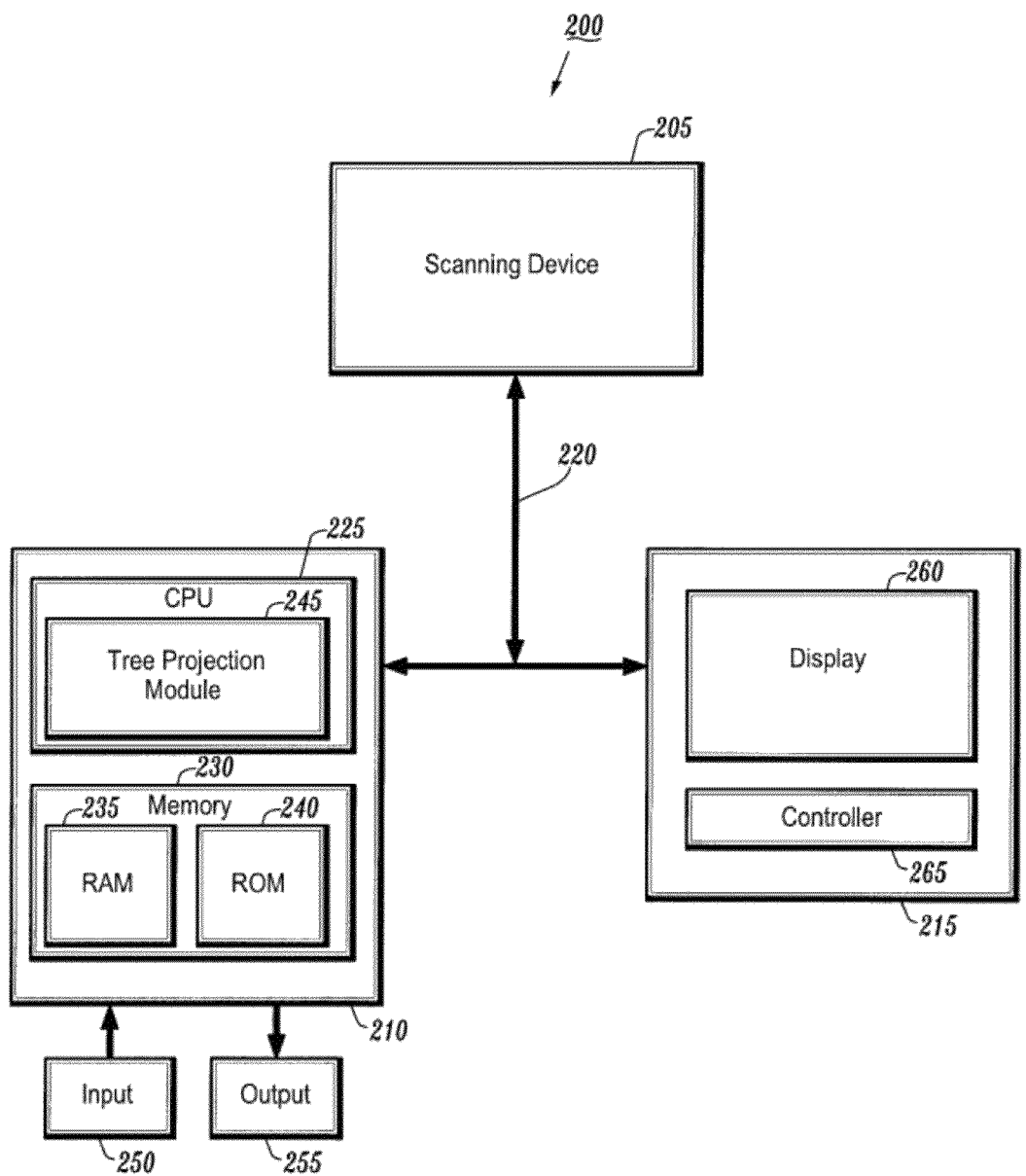
FIG. 2 is a block diagram of a system for tree projection for detection of PE according to an exemplary embodiment of the present invention.

FIG. 2 is a block diagram of a system 200 for tree projection for detection of PE according to an exemplary embodiment of the present invention.

As shown in FIG. 2, the system 200 includes, inter alia, a scanning device 205, a personal computer (PC) 210 and an operator's console 215 connected over, for example, an Ethernet network 220. The scanning device 205 may be a magnetic resonance (MR) imaging device, a CT imaging device, a helical CT device, a positron emission tomography (PET) device, a 2D or 3D fluoroscopic imaging device, a 2D, 3D, or four-dimensional (4D) ultrasound imaging device, or an x-ray device. The scanning device 205 may also be a hybrid-imaging device capable of CT, MR, PET or other imaging techniques.

The PC 210, which may be a workstation, portable or laptop computer, a personal digital assistant (PDA), etc., includes a central processing unit (CPU) 225 and a memory 230, which are connected to an input 250 and an output 255. The CPU 225 includes a tree projection module 245 that includes one or more methods for tree projection for detection of PE.

The memory 230 includes a random access memory (RAM) 235 and a read only memory (ROM) 240. The memory 230 can also include a database, disk drive, tape drive, etc., or a combination thereof. The RAM 235 functions as a data memory that stores data used during execution of a program in the CPU 225 and is used as a work area. The ROM 240 functions as a program memory for storing a program executed in the CPU 225. The input 250 is constituted by a keyboard, mouse, etc., and the output 255 is constituted by a liquid crystal display (LCD), cathode ray tube (CRT) display, or printer.

The operation of the system 200 is controlled from the operator's console 215, which includes a controller 265, for example, a keyboard, and a display 260, for example, a CRT display. The operator's console 215 communicates with the PC 210 and the scanning device 205 so that 2D image data collected by the scanning device 205 can be rendered into 3D data by the PC 210 and viewed on the display 260. It is to be understood that the PC 210 can be configured to operate and display information provided by the scanning device 205 absent the operator's console 215, using, for example, the input 250 and output 255 devices to execute certain tasks performed by the controller 265 and display 260.

The operator's console 215 further includes any suitable image rendering system/tool/application that can process digital image data of an acquired image dataset (or portion thereof) to generate and display 2D and/or 3D images on the display 260. More specifically, the image rendering system may be an application that provides 2D/3D rendering and visualization of medical image data, and which executes on a general purpose or specific computer workstation. Moreover, the image rendering system enables a user to navigate through a 3D image or a plurality of 2D image slices. The PC 210 may also include an image rendering system/tool/application for processing digital image data of an acquired image dataset to generate and display 2D and/or 3D images.

As shown in FIG. 2, the tree projection module 245 may also be used by the PC 210 to receive and process digital medical image data, which as noted above, may be in the form of raw image data, 2D reconstructed data (e.g., axial slices), or 3D reconstructed data such as volumetric image data or multiplanar reformats, or any combination of such formats. The data processing results can be output from the PC 210 via the network 220 to an image rendering system in the operator's console 215 for generating 2D and/or 3D renderings of image data in accordance with the data processing results, such as segmentation of organs or anatomical structures, color or intensity variations, and so forth.

Figure 3:
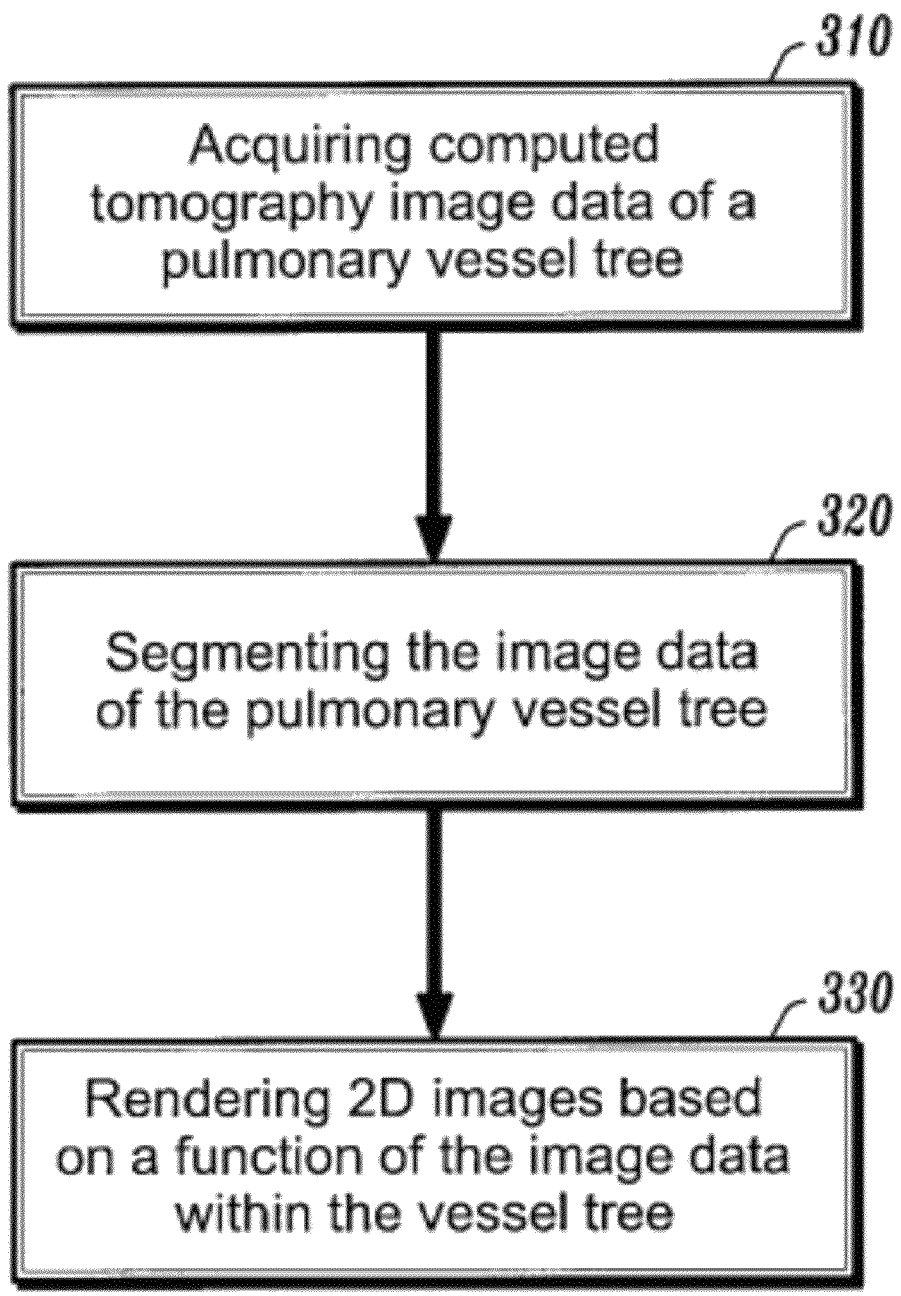
FIG. 3 is a flowchart illustrating a method for tree projection for detection of PE according to an exemplary embodiment of the present invention.

FIG. 3 is a flowchart showing an operation of a method for tree projection for detection of PE according to an exemplary embodiment of the present invention.

As shown in FIG. 3, CT image data of a pulmonary vessel tree is acquired from a pair of lungs inside a patient (310). This is accomplished by using the scanning device 205, in this example a CT scanner, which is operated at the operator's console 215, to scan the patient's chest or lungs thereby generating a series of 2D image slices associated with the lungs. The 2D image slices of the lungs are then combined to form a 3D image. In addition to the lungs, it is to be understood that the CT image data can be acquired from any one of a leg, arm, brain or other body part containing blood vessels. Further, other types of data such as MR image data may be used in accordance with the present invention.

After the CT image data of the pulmonary vessel tree is acquired, the image data of the vessel tree is segmented (320). It is to be understood that the segmentation can be accomplished by using any suitable vessel segmentation method. For example, vessel segmentation techniques such as thresholding and size-based labeling, line-filter based or structure tensor-based segmentations may be used. For completeness, one exemplary vessel segmentation method for use with the present invention will now be described.

First, a mask of the patient's lungs is created via a high-threshold region growing from a seed point in the trachea. A dilation followed by erosion is then performed on the segmented image to fill empty spaces caused by vessels. It should be understood that the erosion operator is slightly larger than the dilation operator to prevent the ribs and other structures near the chest wall from being included in the mask. Lung vessels are then segmented by including all voxels above a threshold value within the lung mask. It should also be understood that the threshold may be set so that it is low enough to capture both contrast-filled and non-contrast filled blood vessels, including those that are fully occluded by emboli.

Figure 4:
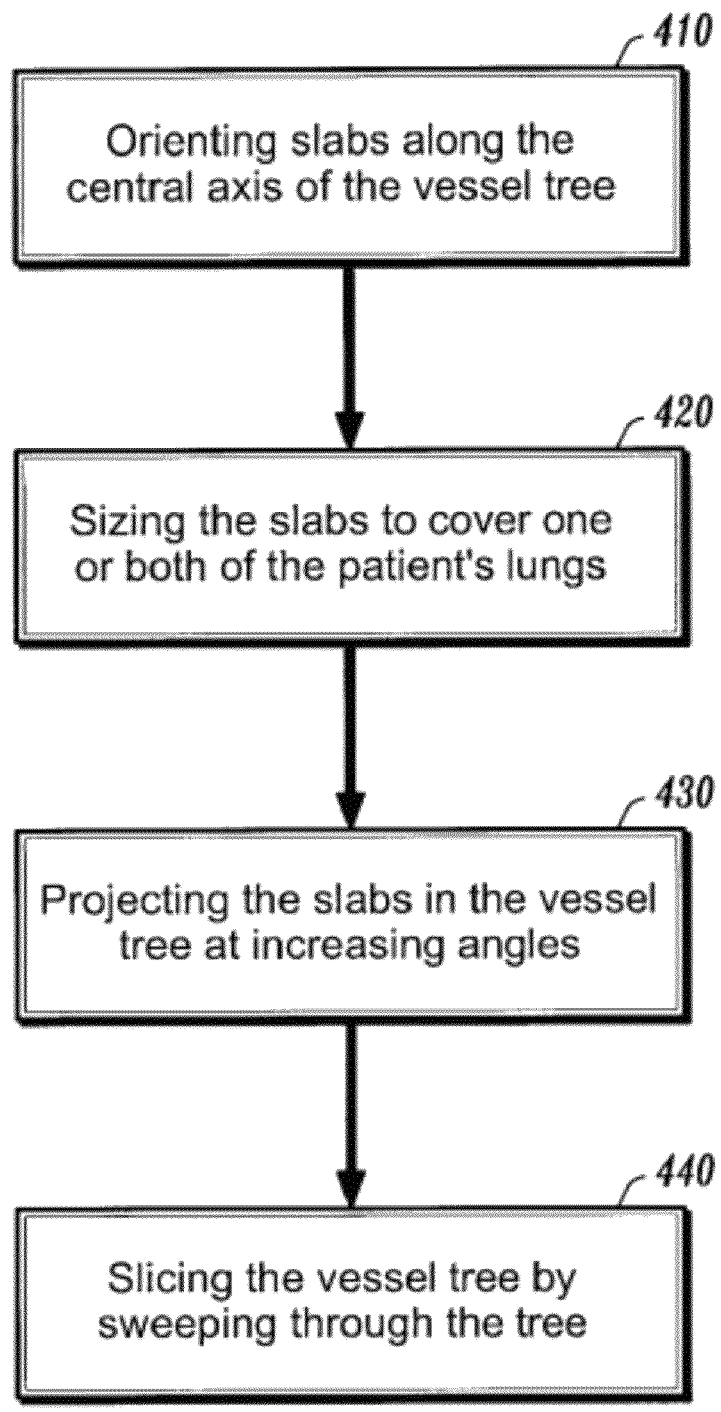
FIG. 4 is a flowchart illustrating a method for rendering a 2D image according to an exemplary embodiment of the present invention.

Given the segmentation of the pulmonary vessel tree, 2D images based on a function of the image data and segmentation within slabs defined by the segmented pulmonary vessel tree are rendered (330). This is accomplished by using the method outlined in FIG. 4. As shown in FIG. 4, the slabs are first oriented along the central axis of the pulmonary vessel tree (410). Next, the slabs are sized to cover one or both of the patient's lungs (420) and then projections of the slabs rotated about the pulmonary vessel tree at increasing angles are computed (430). Finally, the slabs are sliced through the tree by sweeping through a complete circle (440). The resulting set of slab images may then be shown to a user of the system 200 as a cine loop for quick evaluation.

Figure 5:
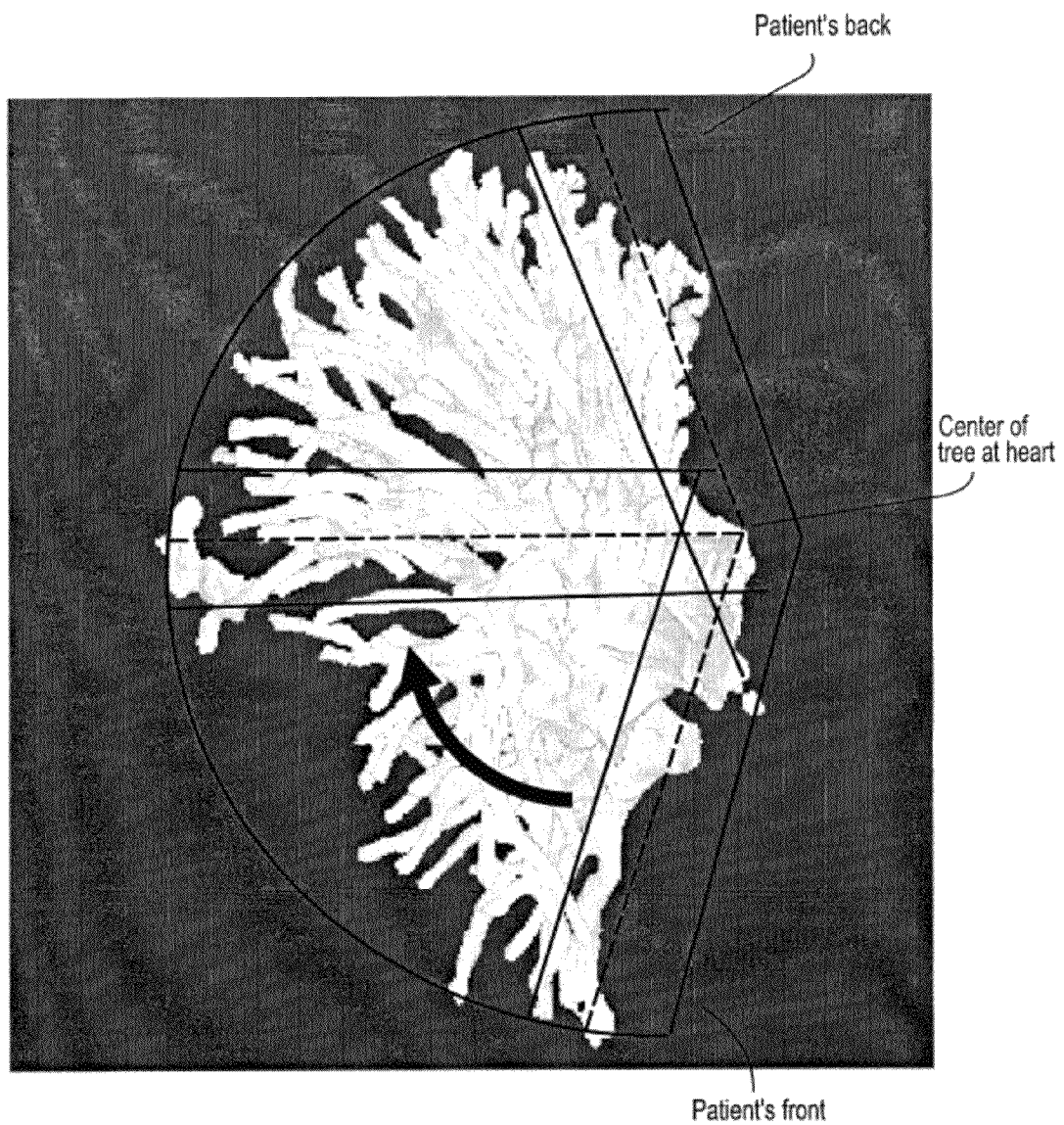
FIG. 5 is a diagram illustrating tree projection when observed from the top of a pulmonary vessel tree according to an exemplary embodiment of the present invention.

An example of the tree or cartwheel-like projection described in steps 410-440 is illustrated in FIG. 5. As shown in FIG. 5, the center of the projection is at the center of the tree, where pulmonary vessels enter and exit the heart, and is aligned with the patient's z-axis pointing from the feet toward the head. The slab illustrated in FIG. 5 only covers a single lung. It should be understood, however, that slabs of each lung could be projected separately to allow medical practitioners examine each lung individually for PE. In addition, a projection of slabs across both lungs is possible and will be discussed hereinafter with reference to FIG. 8.

Referring back to the right lung vessels shown in FIG. 5, the slices or slabs are acquired in a clockwise direction from the patient's front through the patient's back. A further example of this is illustrated in image (a) of FIG. 6 for a slab ending at the axis of rotation. Such a slab only covers one lung at a time when oriented in the z-axis. It should be understood that for a corresponding left lung image (unlike the right lung image of FIG. 5) the slabs may be acquired in a counter-clockwise direction from the patient's front to the patient's back. Alternatively, both lungs may be imaged at the same time (as shown and described hereinafter with reference to FIGS. 8 and 10) with slabs being acquired in a single direction (either clockwise or counterclockwise) from the patient's back to the patient's front.

Figure 6A:
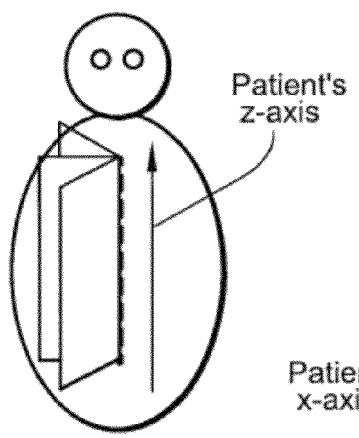
FIG. 6 is a series of diagrams illustrating tree projection around a patient's x, y and z-axis according to an exemplary embodiment of the present invention.
Figure 6B:
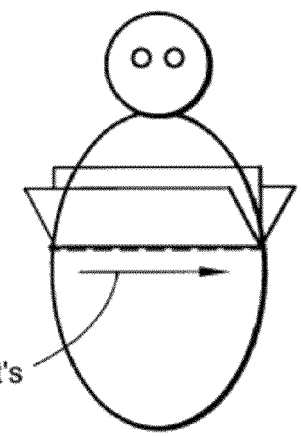
Figure 6C:
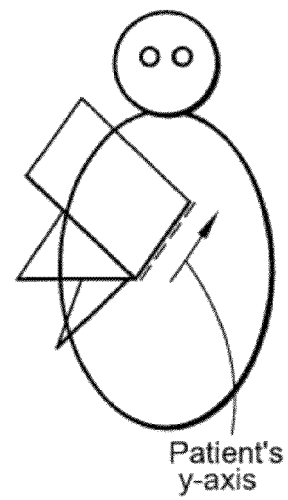
Figure 8A:
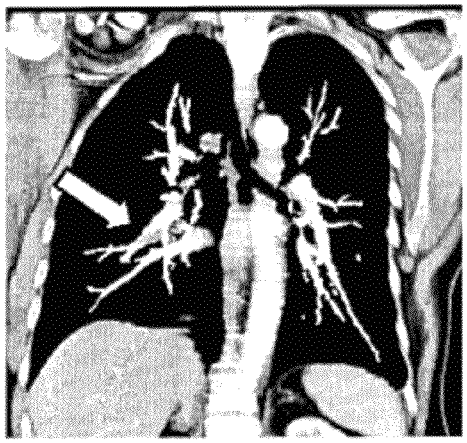
FIG. 8 is a series of images illustrating successive rotations about a patient's z-axis using an average intensity projection (AIP) anatomy referenced rendering according to an exemplary embodiment of the present invention.
Figure 8B:
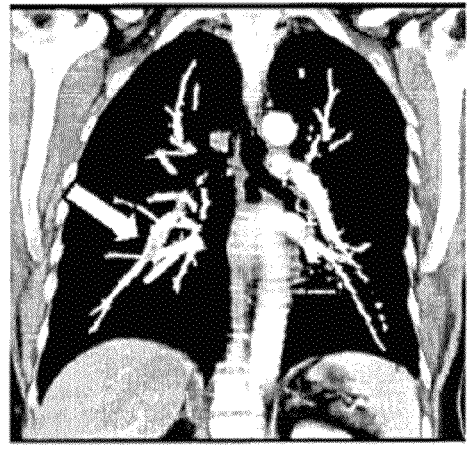
Figure 8C:
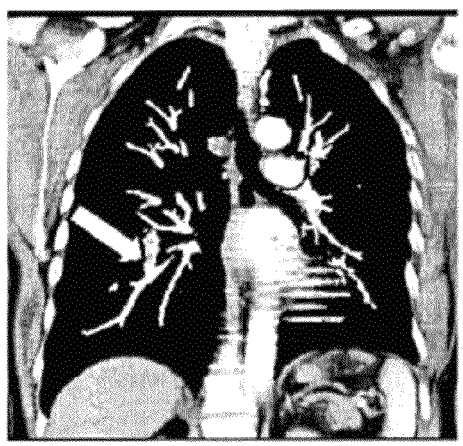
Figure 8D:
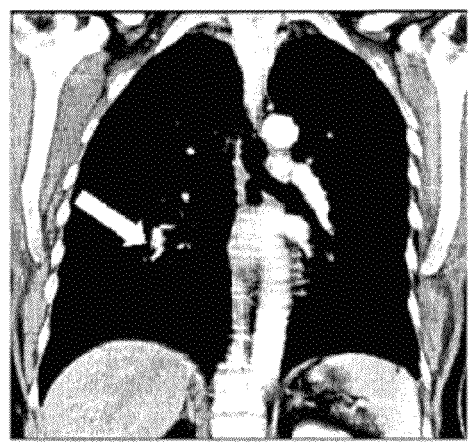

Images (b) and (c) of FIG. 6 illustrate alternative directions of projection through the patient's x and y-axis, respectively. It is to be further understood that once an orientation is chosen, whether it be the x, y or z-axis, the slab can be rotated about the selected axis to encompass the vessels with the lungs.

The number of images necessary to view all of the vessels is given by the following equation:

$$N = \frac{\pi}{2 \times \tan^{-1}(t/(2 \times r))} \quad [1]$$

where t is the thickness of the slab, r is the radius of influence and N is the total number of images taken as the ceiling value of the fraction. If N results in a fraction, the integer portion plus one is taken as the number of images.

Figure 10:
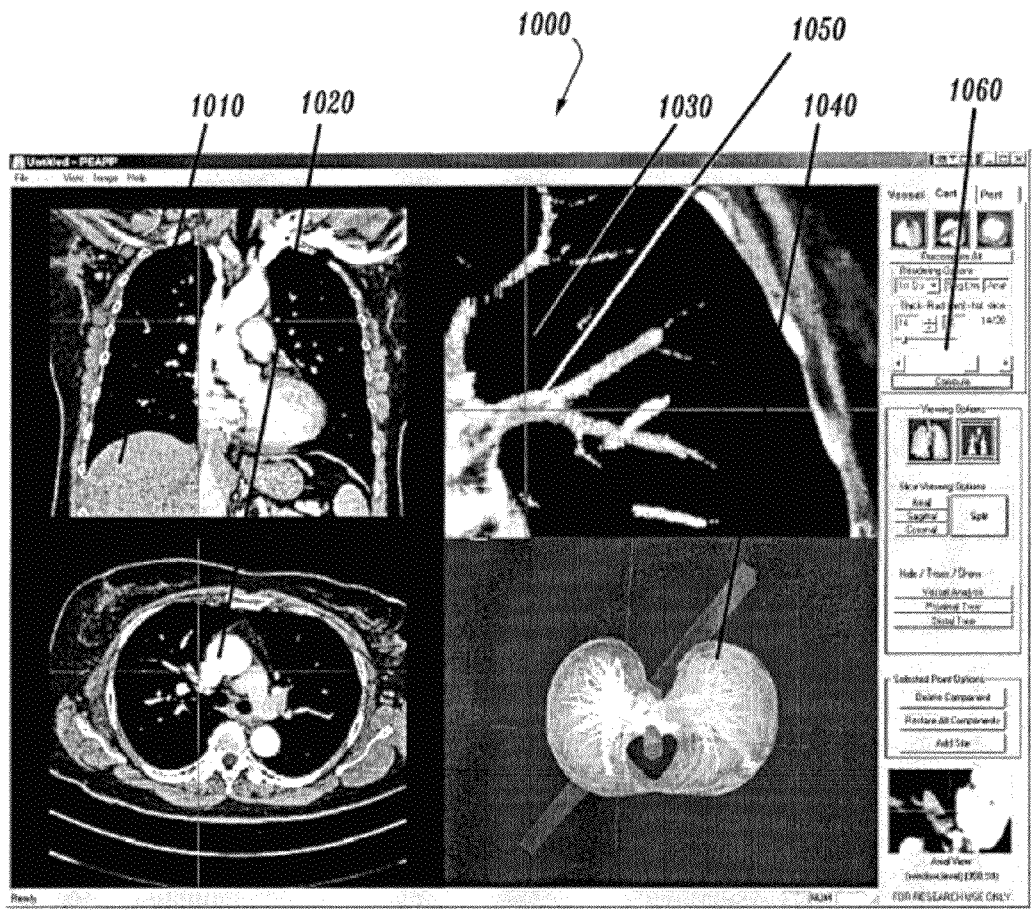
FIG. 10 is a user interface of a system for tree projection for detection of PE according to an exemplary embodiment of the present invention.

In equation [1], it is assumed that the slabs will be wide enough to cover both lungs at the same time as shown in FIGS. 8 and 10. Because the slabs extend across the full width of the lungs, it is sufficient to sweep through 180 degrees to sample the entire circle defined by the radius r. If it is desirable to image only one lung at a time the number of slabs will double as it would be necessary to sweep through 360 degrees. In this instance, however, each slab would be half as wide as the slabs extending across the lungs.

In equation [1], the radius of influence, r, determines the maximum radius (in, for example, millimeters) at which the slabs will completely cover the patient's lungs with a slight overlap. Below this radius, the slabs have increasing overlap, beyond this radius there will be gaps between the slabs, and thus there will be incomplete coverage of any image data outside the circle defined by this radius. In addition, a thicker slab results in a decrease in the number of images. Although a larger patient may require a larger radius of influence, r, resulting in a larger number N, a constant value of r should be adequate for most patients.

Another formula for determining the number of images necessary to view all of the vessels and is given by the following:

$$N = \frac{\pi \times r}{t} \quad [2]$$

where t is the thickness of the slab, r is the radius of influence and N is the total number of images taken as the ceiling value of the fraction. If N results in a fraction, the integer portion plus one is taken as the number of images. Again, this equation assumes that the slabs cover both lungs at the same time and therefore it is sufficient to sweep through 180 degrees to get full coverage. In addition, one lung may be examined at a time by creating twice the amount of slabs and by sweeping through 360 degrees with each slab being half the width of the slabs covering both lungs.

Each resulting slab orientation generates a single 2D image based on the available data. This data includes information from the original image as well as the segmented image. When experimenting with projections of the data within the slabs, four different rendering methods were used: MIP, AIP, minimum intensity projection (MinIP) and 1$^{st}$ Quartile (1Q). The MIP method output the maximum HU value within a cast ray, while the MinIP method took the lowest value. The AIP method output the average value and the 1Q method sorted the results and took the first or lowest quartile of the sorted results.

An example of a series of voxels taken from a slab used to compute the above-described projections for a single pixel within a resulting 2D image is shown in image (a) of FIG. 7. As shown in image (a), a ray 720 is cast through a slab 710 and encounters voxels 730 that are then used to compute the MIP, MinIP, AIP or 1Q projections.

Referring back to step 320, the purpose of the vessel segmentation therein is to define which voxels are to be considered for rendering. More specifically, the voxels that are outside the segmented vessels are not included in the subsequent rendering. This enhances the sensitivity of the present invention and improves the results of certain rendering techniques used in conjunction with the present invention. An example of this is shown in image (b) of FIG. 7.

As shown in FIG. 7, once vessel segmentation is performed, two possibilities exist for rays 750*a* and 750*b* cast through a slab 740. In the first situation shown by voxels 760, the ray 750*b* encounters the segmentation. In this situation, only the voxels within the segmentation are used for the computation. In the second situation shown by voxels 770, the ray 750*a* encounters no segmented regions, thus the output is dark (e.g., −1024 HU) or the computation of the standard projection. As a result, the dark output will only show the segmented vessels within the slab. However, use of the standard projection in these regions will display external structures that can provide an anatomical reference.

Experimentation in accordance with the present invention was performed on several datasets having PE. The method of the present invention used a viewing (on average) of 26 slabs per patient having, for example, a 9 mm slab thickness for visualizing PE. In the conventional paddlewheel method, 45 slabs per patient having, for example, a 5 mm slab thickness, were needed to achieve a similar sensitivity for visualizing PE. Images (a-d) of FIG. 8 illustrate successive rotations about the z-axis using an AIP rendering with an 11 mm slab thickness. As can be seen, the PE (indicated by the arrows) is clearly visible, especially in image (b).

FIG. 9 illustrates comparisons among different rendering parameters and slab thicknesses at the same region and axis of an image. The renderings taking in accordance with an embodiment of the present invention only show the segmented regions. It is to be understood, however, that in another embodiment the projection computation in regions outside the segmentation for an anatomical basis is shown.

It will be gleaned from a review of FIG. 9 that in accordance with an embodiment of the present invention, a larger slice thickness results in fewer images for viewing at the cost of potentially lower sensitivity; however, the drop in sensitivity is less when compared to a conventional method such as paddlewheel. The next few paragraphs will be devoted to discussing the images of FIG. 9.

As shown in FIG. 9, the paddlewheel method was used to acquire images (a-d). As shown in images (a-c), as the thickness of the slices or slabs increase from image to image the PE located between the crosshairs became increasingly less visible. For example, at a slab thickness of 5 mm as in image (a), the paddlewheel method with a MIP rendering had a sensitivity of 84%. At a 25 mm slab thickness shown in image (c), the sensitivity of the paddlewheel method dropped to 63%. As shown in image (d), the paddlewheel method with an AIP rendering taken at an 11 mm thick slab shows poor PE visualization along with several missing branches. As can be observed, images (a-c) demonstrate the lack of sensitivity at larger slab thicknesses and image (d) demonstrates the limitations of MIP projections when using the paddlewheel method.

The method of the present invention using an AIP rendering at 5 mm, 11 mm and 25 mm thicknesses was used to acquire images (e-g) of FIG. 9. As shown in images (e-g), the PE is more visible than that of images (a-d) and remained so at thicker slab settings. In addition, the method of the present invention using a 1Q rendering at 5 mm, 11 mm and 25 mm thicknesses was used to acquire images (h-j) of FIG. 9. The method of the present invention using a MinIP rendering at 11 mm was also used to acquire image (k) of FIG. 9. As shown in images (h-k), the PE is more visible than that of images (a-d) and remained so at thicker slab settings.

FIG. 10 is a screen-shot of a user interface 1000 of a system for tree projection for detection of PE according to an exemplary embodiment of the present invention. As shown in FIG. 10, coronal 1010 and transverse 1020 views are on the left side of the interface 1000 while cartwheel 1030 and rendered views 1040 are on the right side of the interface 1000, with the cartwheel view 1030 being rendered from a 14 mm thick slab using a 1Q rendering option. In addition, a control panel 1060 can be used by a user to control the display of, for example, the cartwheel view 1030 by displaying it as a cine loop, or it can be used by the user to select between different rendering options.

As shown in FIG. 10, the user interface 1000 also allows a user to click on locations within any of the views 1010-1040 to update unselected views. For example, if a PE 1050 in the cartwheel view 1030 is marked by a user, the system could automatically indicate the corresponding position in the other views 1010, 1020 and 1040. This location or series of locations could then be saved and annotated.

According to an exemplary embodiment of the present invention, a tree projection approach to PE visualization that computes slab projections of original CT data aided by vessel segmentation is provided. The use of vessel segmentation within the tree projection computation allows the use of thick slabs as well as the ability to employ visualization variations, thus yielding a more efficient workflow. Following the segmentation of the pulmonary vessels, the slabs may be rotated around the x, y or z-axis. These slabs may be rendered by using voxels within the lung vessels. This effectively eliminates distracting information not relevant to diagnosis, lessening both the chance of overlooking a subtle embolus and minimizing time spent evaluating false positives.

It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for detecting a pulmonary embolism (PE), comprising:

receiving original image data of a structure of interest;

segmenting the original image data of the structure of interest;

rendering two-dimensional images of the structure of interest, wherein the rendering of a two-dimensional image is performed in a single rendering operation, wherein the single rendering operation comprises casting at least one ray through a slab of a plurality of slabs of the original and segmented image data, identifying voxels of both the original and segmented image data that are encountered by the ray, not rendering the original image data encountered by the ray and rendering original image data that corresponds to the segmented image data encountered by the ray, and wherein the voxels considered for the rendering are solely defined by the segmentation and the individual slab through which the at least one ray is cast; and displaying the two-dimensional image to assist a user in identifying an unmarked PE inside the structure of interest.

2. The method of claim 1, wherein the structure of interest is segmented using one of a thresholding and size-based labeling, line-filter based or structure tensor-based segmentation technique.

3. The method of claim 1, wherein, when the structure of interest is a pulmonary vessel tree, the step of rendering comprises:

initially orienting the slabs along an axis of the pulmonary vessel tree;

sizing the slabs to cover one of left and right lungs or one of the left or right lungs of the pulmonary vessel tree;

computing projections of the slabs rotated about the pulmonary vessel tree; and slicing the pulmonary vessel tree.

4. The method of claim 3, wherein the slabs are initially oriented along one of the x, y or z axis.

5. The method of claim 3, wherein the slabs are initially oriented along one of an axis defined by a patient's anatomy or a central axis of the pulmonary vessel tree.

6. The method of claim 1, wherein the number of two-dimensional images is defined by:

$$N = \frac{\pi}{2 \times \tan^{-1}(t/(2 \times r))},$$

where N is the number of two-dimensional images taken as a ceiling value of the fraction, t is a thickness of the slabs and r is a radius of influence.

7. The method of claim 1, wherein the number of two-dimensional images is defined by:

$$N = \frac{\pi \times r}{t},$$

where N is the number of two-dimensional images taken as a ceiling value of the fraction, t is a thickness of the slabs and r is a radius of influence.

8. The method of claim 1, wherein the number of slabs is defined by one of a function of the slab thickness, slab overlap or radius of the structure of interest.

9. The method of claim 1, further comprising:
presenting the slabs as a cine loop.

10. The method of claim 9, further comprising:
adjusting the cine loop.

11. The method of claim 10, wherein the adjustment is one of speed, slab thickness, rotation axis or rendering method.

12. The method of claim 1, wherein the individual slab is about 11 mm to about 25 mm thick.

13. A non-transitory computer readable storage medium storing instructions that, when executed by a computer, cause the computer to perform a method for detecting a pulmonary embolism (PE) in a pulmonary vessel tree, the method comprising:
receiving original image data of a pulmonary vessel tree;
segmenting the original image data of the pulmonary vessel tree;
rendering two-dimensional images of the pulmonary vessel tree,
wherein the rendering of a two-dimensional image is performed in a single rendering operation,
wherein the single rendering operation comprises casting at least one ray through a slab of a plurality of slabs of the original and segmented image data, identifying voxels of both the original and segmented image data that are encountered by the ray, not rendering the original image data encountered by the ray and rendering original image data that corresponds to the segmented image data encountered by the ray, and
wherein the voxels considered for the rendering are solely defined by the segmentation and the individual slab through which the at least one ray is cast; and
displaying the two-dimensional image to assist a user in identifying an unmarked PE inside the pulmonary vessel tree.

14. The computer readable storage medium of claim 13, wherein the pulmonary vessel tree is segmented using one of a thresholding and size-based labeling, line-filter based or structure tensor-based segmentation technique.

15. The computer readable storage medium of claim 13, wherein the step of rendering comprises:
initially orienting the slabs along an axis of the pulmonary vessel tree;
sizing the slabs to cover one of left and right lungs or one of the left or right lungs of the pulmonary vessel tree;
computing projections of the slabs rotated about the pulmonary vessel tree at increasing angles; and
slicing the pulmonary vessel tree by sweeping through a complete circle.

16. The computer readable storage medium of claim 15, wherein the slabs are initially oriented along one of the x, y or z axis, an axis defined by a patient's anatomy or a central axis of the pulmonary vessel tree.

17. The computer readable storage medium of claim 13, wherein the number of two-dimensional images is defined by:

$$N = \frac{\pi}{2 \times \tan^{-1}(t/(2 \times r))},$$

where N is the number of two-dimensional images taken as a ceiling value of the fraction, t is a thickness of the slabs and r is a radius of influence.

18. The computer readable storage medium of claim 13, wherein the number two-dimensional images is defined by:

$$N = \frac{\pi \times r}{t},$$

where N is the number of two-dimensional images taken as a ceiling value of the fraction, t is a thickness of the slabs and r is a radius of influence.

19. The computer readable storage medium of claim 13, wherein the number of slabs is defined by one of a function of the slab thickness, slab overlap or radius of the structure of interest.

20. The computer readable storage medium of claim 13, further comprising:
presenting the slabs as a cine loop; and
adjusting the cine loop, wherein the adjustment is one of speed, slab thickness, rotation axis or rendering method.

21. A system for detecting a pulmonary embolism (PE) in a structure of interest, comprising:
a memory device for storing a program;
a processor in communication with the memory device, the processor operative with the program to:
receive original image data of a structure of interest;
segment the original image data of the structure of interest;
render two-dimensional images of the structure of interest,
wherein the rendering of a two-dimensional image is performed in a single rendering operation,
wherein the single rendering operation comprises casting at least one ray through a slab of a plurality of slabs of the original and segmented image data, identifying voxels of both the original and segmented image data that are encountered by the ray, not rendering the original image data encountered by the ray and rendering original image data that corresponds to the segmented image data encountered by the ray, and
wherein the voxels considered for the rendering are solely defined by the segmentation and the individual slab through which the at least one ray is cast; and
display the two-dimensional image to assist a user in identifying an unmarked PE inside the structure of interest.

22. The system of claim 21, wherein the image data is acquired using one of a computed tomography or magnetic resonance imaging device.

23. The system of claim 21, wherein, when rendering, the processor is further operative with the program to:
   initially orient the slabs along a central axis of the structure of interest;
   compute projections of the slabs rotated about the structure of interest at increasing angles; and
   slice the structure of interest.

24. The system of claim 21, wherein the processor is further operative with the program to:
   present the slabs as a cine loop.

25. The system of claim 24, wherein the processor is further operative with the program to:
   adjust the cine loop.

* * * * *